Nov. 3, 1959 — W. RICHTER — 2,910,941
ELECTROMAGNETIC CENTRIFUGAL PUMP
Original Filed Aug. 14, 1953 — 2 Sheets-Sheet 1
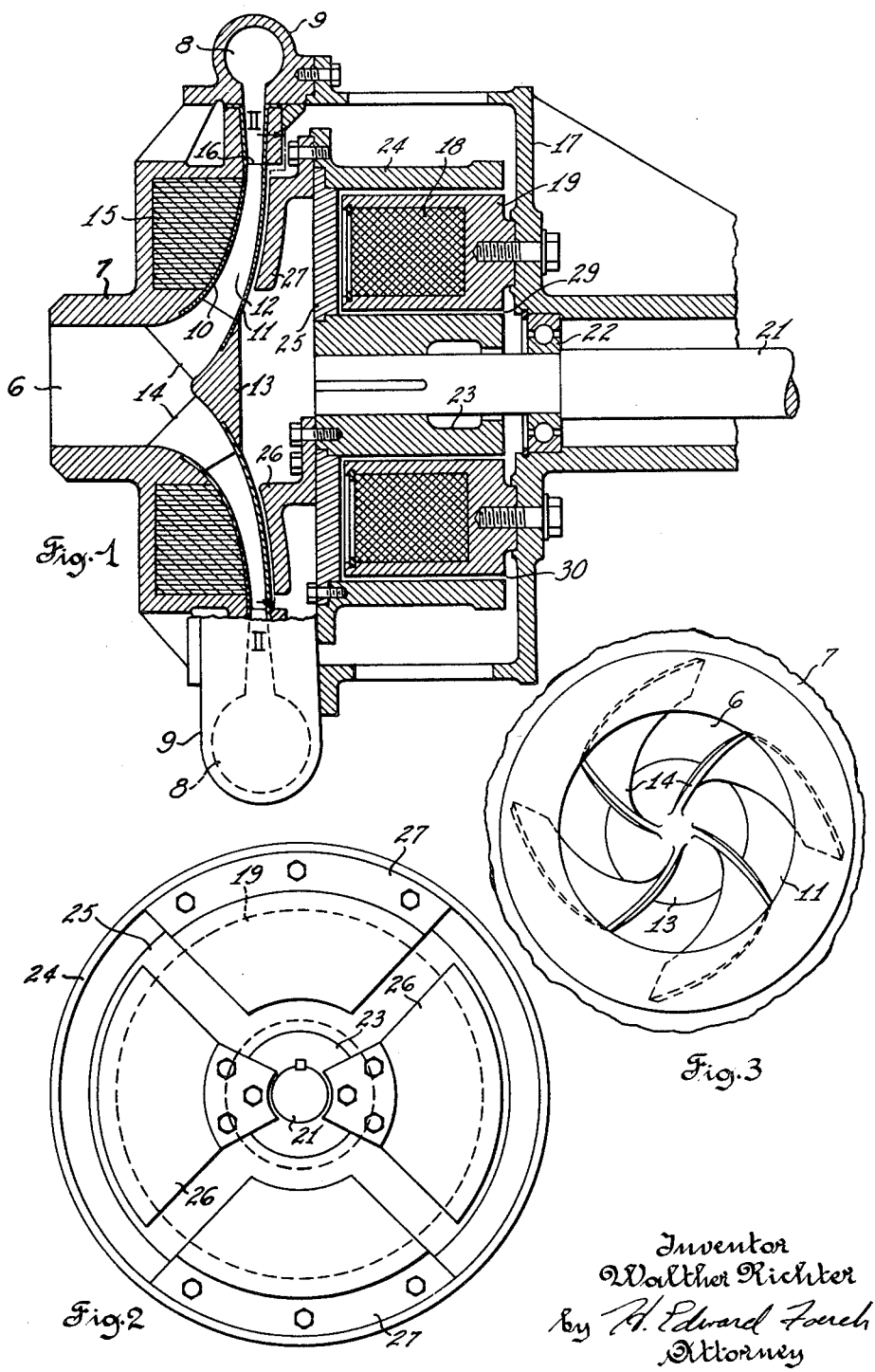
Inventor
Walther Richter
by H. Edward Foreh, Jr.
Attorney

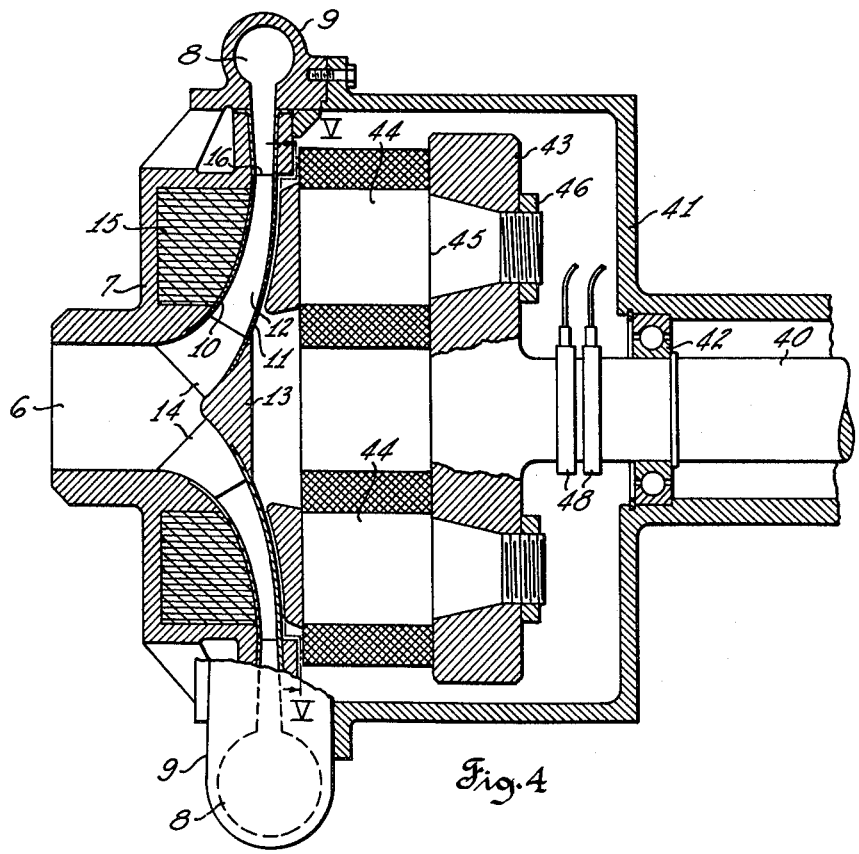
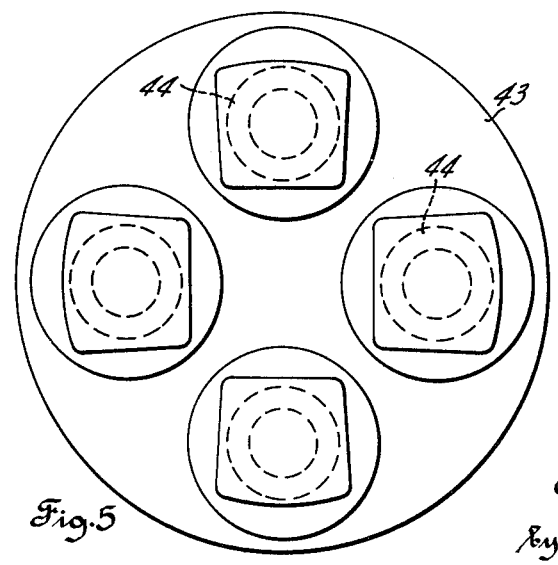

United States Patent Office 2,910,941
Patented Nov. 3, 1959

2,910,941

ELECTROMAGNETIC CENTRIFUGAL PUMP

Walther Richter, Milwaukee, Wis., assignor to Allis-Chalmers Manufacturing Company, Milwaukee, Wis.

Original application August 14, 1953, Serial No. 374,259, now Patent No. 2,847,936, dated August 19, 1958. Divided and this application August 16, 1957, Serial No. 678,467

2 Claims. (Cl. 103—1)

This invention relates to an electromagnetic pump for liquid metals in which motion is imparted to liquid metal by the action of a rotating magnetic field produced by rotation of a magnet structure. The present application is a division of my copending application Serial No. 374,259, filed August 14, 1953, which issued on August 19, 1958, as Patent No. 2,847,936.

The electromagnetic pump of this invention comprises circumferentially spaced field poles rotated in proximity to a thin annulus or annular gap carrying liquid metal. The magnetic field is directed through the fluid from one field pole to a backing structure of magnetic material, then back again through the liquid metal to another field pole of opposite polarity. The field poles are excited by direct current excitation.

The liquid metal tends to rotate in the annulus with the magnetic field. Centrifugal force of the moving metal causes it to flow radially out of the magnetic field as it rotates therein. Thus more liquid metal is drawn into the annulus from a center duct or suction end of the centrifugal pump and pumping action is thereby effected.

Some advantages of this type of electromagnetic pump are that no moving parts are required in the liquid metal being pumped; the flow of the liquid metal may be controlled by varying the speed of the rotating magnet structure or by varying the field excitation current; and the rotating magnetic structure provides fan action for self-cooling of the pump.

It is an object of the present invention to provide an improved electromagnetic pump having a rotating magnetic field to effect pumping action of liquid metal in a closed system of fluid flow.

Another object of the invention is to provide an electromagnetic pump having a rotating magnetic field produced by direct current excited field poles.

Another object of this invention is to provide an electromagnetic pump having a rotating magnetic field in which the field producing coils are self-cooled.

Another object of the invention is to provide an electromagnetic centrifugal pump which gives a predetermined prerotation or prewhirl to the conductive fluid being pumped before it enters the magnetic field.

Objects and advantages of this invention other than those above set forth may be readily apparent to one skilled in the art upon a reading of the following description together with the accompanying drawings, in which:

Fig. 1 is a view partly in elevation and partly in section of an electromagnetic pump embodying the present invention;

Fig. 2 is a view taken along the line II—II of Fig. 1 showing the rotatable magnetic structure thereof;

Fig. 3 is an enlarged end view showing the guide vanes of Fig. 1;

Fig. 4 is a view partly in elevation and partly in section of another electromagnetic pump embodying the present invention; and Fig. 5 is a view taken along the line V—V of Fig. 4 showing the field pole arrangement thereof.

Referring to the drawings, numeral 6 indicates the inlet duct or suction end of an electromagnetic centrifugal pump. Inlet duct 6 is formed by a portion 7 of the pump casing which is made of a suitable material that does not react chemically with the conductive fluid being pumped. For electrically conductive fluids such as sodium, sodium-potassium alloys, or lithium, the pump casing is preferably made of stainless steel or lined therewith. The discharge duct 8 of the pump is formed by a volute shaped portion 9 of the pump casing. Spaced apart annular plates 10 and 11 define the duct connecting the suction end of the pump with the discharge end thereof. The plates 10 and 11 may be made of any suitable non-magnetic material and are preferably thin sheets of non-magnetic stainless steel. The plates are formed to define a smooth but relatively narrow annular gap or passage 12 for the flow of liquid metal therethrough. Plate 10 is secured such as by welding to casing portion 7 at inlet duct 6 and to a flange of the volute portion 9 of the casing. Plate 11 is suitably secured to the other flange of the volute portion of the casing. A central portion or hub 13 is secured to the plate 11. The hub 13 and plate 11 form a disk which is made rigid with plate 10 and pump casing 7 by inlet guide vanes 14 which are welded thereto. The guide vanes are smooth stainless steel members curved as shown in Fig. 3, to form a predetermined flow path for the liquid metal entering the rotating magnetic field to give such liquid metal a predetermined rotation in the direction of rotation of the magnetic field so the liquid metal enters the magnetic field with a predetermined angular velocity.

An annular laminated magnetic core 15 is disposed in abutment with plate 10 and concentric to inlet duct 6. Core 15 forms a stationary member for the rotating magnetic field of the machine.

A frame 17 for the stationary portion of the field producing structure may be supported upon a suitable base or foundation. The frame 17 is also secured to a flange on the discharge volute. A ring coil 18 coaxially aligned with core 15 is disposed in a corresponding U-shaped ring yoke of magnetic material. Yoke 19 is bolted to the frame 17. A source of direct current excitation, not shown, is connected to coil 18.

A rotating magnet structure comprises a shaft 21, supported in suitable bearings 22. The shaft is connected to suitable means (not shown) for driving it at any suitable speed. A first tube or hollow cylinder 23 of magnetic material is mounted on the shaft concentric with yoke 19 and defines an air gap 29 between yoke 19 and cylinder 23. A second tube or hollow cylinder 24 of magnetic material is disposed adjacent the radially outer periphery of yoke 19 and defines an air gap 30 between yoke 19 and cylinder 24. Cylinder 24 is supported by a radially extending rigid annular ring 25 of suitable nonmagnetic material. Ring 25 has L-shaped shoulder portions abutting corresponding L-shaped shoulders in the end portions of cylinders 23, 24.

Suitable pole pieces or finger poles 26 are bolted to cylinder 23 and extend radially outward therefrom. The heel portion of pole pieces 26 abuts both the end of cylinder 23 and the face of ring 25 to make a rigid assembly therewith. Pole pieces 27 are similarly bolted to the end of cylinders 24 and heel portions of the pole pieces abut the end of the cylinder and the face of the ring. Pole pieces 27 extend radially inward in interleaved relationship with the pole pieces 26. The portion of cylinder 23 adjoining a pole piece 26 may be considered as a portion thereof. Similarly, the portion of cylinder 24 adjoining pole piece 27 may be considered as a portion of pole piece 27.

Pole pieces 26, 27 are thus disposed in coaxial alignment with stationary core 15, and the pole faces correspond to the shape of adjacent plate 11, from which they may be spaced only for running clearance. Plates 10 and 11 defining the passage in the axial gap between pole pieces 26, 27 and core 15 converge radially outward to a point 16 just outside the region of effective magnetic field. From this point the walls of passage 12 diverge to the volute 8.

In the operation of the electromagnetic pump, Fig. 1, the electrically conductive fluid to be pumped, such as sodium, sodium-potassium alloys, or lithium, fills the inlet duct and passage 12. Shaft 21 is rotated and direct current excitation is applied to coil 18. Flux linking coil 18 flows in a magnetic path from yoke 19 across an air gap 30 to cylinder 24 for a predetermined direction of current in coil 18. From cylinder 24 the flux flows to a pole piece 27, then across the magnetic gap through the liquid metal in passage 12 to core 15. The flux flows in core 15 until adjacent a pole piece 26, then it crosses the gap through passage 12 to a pole piece 26. From pole piece 26 the flux flows to cylinder 23, then across air gap 29 back to yoke 19 to complete the magnetic circuit.

Pole pieces 26 and 27 carry unidirectional flux which flows in pole pieces 26 in a direction opposite to its flow in pole pieces 27. Since pole pieces 26 are interleaved with pole pieces 27, the adjacent poles are of opposite polarity. The pole pieces being rotated, the magnetic field is a rotating magnetic field.

Liquid metal in annular passage 12 cuts lines of flux of the rotating magnetic field and therefore voltages are induced in the liquid metal producing currents therein. The reaction between these currents and the field flux causes rotation of the liquid metal which tends to follow the rotating field. Centrifugal force of the liquid metal causes it to flow radially outward as it is rotated. The convergence of passage 12 in a radially outward direction and the curvature of the guide vanes are designed to cause the liquid metal entering the magnetic field to have a predetermined rotative speed relative to the speed of the rotating magnetic field.

The fluid is pumped in a closed circuit and the absolute pressure head of the fluid at the suction end of the pump is made sufficiently positive so that the fluid still has a positive pressure head upon discharge from the prewhirl or prerotational vanes to prevent undesirable cavitation taking place. The pressure head of the fluid discharged from the pump then must equal the pressure head at the suction end plus the pressure drop in the system, and the theoretical head developed by the pump is the difference between the head at the discharge end and the head at suction end of the pump. The pump may also be designed for a given fluid in a closed circuit so that pressure available at the suction end of the pump may be utilized by means of the converging inlet to increase the velocity of the fluid and by means of the guide vanes to give the fluid a predetermined prewhirl or prerotation. The difference in the prewhirl speed and the speed of rotation of the magnetic field represents the slip speed of the pump. The machine is designed for its most efficient operation at rated output for a given fluid for a predetermined speed of rotation of the magnetic field. For other fluids or for other output the excitation or the speed of rotation of the magnetic field, or both, may be changed to operate efficiently as possible. Out of the effective region of the magnetic field the liquid metal flows through the diverging portion of passage 12 which gradually changes the velocity head of the liquid metal to a pressure head thereof as it flows into discharge volute 8.

The flow of the liquid metal may be controlled by varying the speed of the rotating magnet structure or by varying the excitation current supplied to coil 18 for varying the strength of the magnetic field.

Rotating pole pieces 26 and 27 act as a fan causing air to circulate for ventilation of the magnet structure and of the adjacent surface of plate 11.

The electromagnetic centrifugal pump shown in Fig. 4 has a rotating magnetic field produced by an overhung field structure mounted on a rotatable shaft 40. Shaft 40 is supported in suitable bearings 42 in the frame 41 of the machine. Frame 41 is supported on a suitable foundation and is secured to the volute casing 9 for aligning the rotating and stationary elements of the machine.

The overhung field structure comprises an annular yoke 43 rigidly secured to the shaft. A plurality of field poles 44 extend axially of yoke 43. Each field pole extends through an aperture in yoke 43 with a shoulder 45 on the field pole abutting one side of the yoke. The end of the field pole is threaded and has a nut 46 threaded thereon which abuts the other side of the yoke to rigidly secure the field pole.

The field poles are provided with coils which are suitably connected to slip rings 48 mounted on the shaft 40 between the yoke and the adjacent bearing. The slip rings are connected to a source of excitation current, not shown, for energizing the field coils. The coils are connected so that energization thereof causes adjacent field poles to be excited for opposite polarity. The field poles are provided with pole pieces whose shapes correspond to that of the surface of plate 11 which is the adjacent wall of annular passage 12.

In operation, excitation current is supplied to the field coils and the shaft is rotated at a predetermined speed. Either the shaft speed or the field strength may be varied for controlling the amount of liquid metal pumped.

While only two embodiments of this invention have been shown and described, it will be apparent to one skilled in the art that various changes or modifications may be made therein without departing from the spirit of the invention or from the scope of the appended claims.

What is claimed is:

1. An electromagnetic centrifugal pump for liquid metals, said pump comprising spaced walls defining an annular gap for the flow of the liquid metal therethrough, a stationary annular laminated core coaxial of said annular gap on one side thereof, a rotatable shaft coaxially aligned with said annular gap on the other side thereof, a stationary field coil concentric with said shaft, a plurality of pole pieces adjacent said annular gap and secured to said shaft for rotation therewith, a first pole piece having a portion thereof extending axially of said field coil adjacent the radially inner periphery thereof, a second pole piece having a portion thereof extending axially of the field coil adjacent the radially outer periphery thereof, a stationary yoke substantially bridging the radially outer axially extending portions of said pole pieces on the side of said coil remote from said annular gap with the radially inner portions of said pole pieces, a source of direct current excitation, means for connecting said field coil to said source to cause flux to circulate from one of said pole pieces across said annular gap to said stationary core, thence back across said annular gap to said adjacent pole piece, and thence through said yoke and to said one said pole piece, means rotating said shaft, whereby a rotating magnetic field is produced in said annular gap imparting rotational motion to the liquid metal therein.

2. An electromagnetic centrifugal pump for liquid metals, said pump comprising spaced walls defining an annular gap, a stationary laminated annular core coaxial of said annular gap on one side thereof, a rotatable shaft coaxially aligned with said annular gap on the other side thereof, radially spaced inner and outer hollow cylinders concentric with said shaft and rotatable therewith, each of said hollow cylinders having radially extending pole pieces adjacent said annular gap with the pole pieces of one hollow cylinder interleaved with the pole pieces of the other hollow cylinder, a stationary ring core of U-shaped cross section disposed between said hollow cylinders, a field coil concentric with said shaft disposed within the U-shaped recess of said ring core, a source of direct current excitation, means connecting said field coil to said source, whereby said field coil produces a magnetomotive force including said stationary ring core, said pole pieces, said annular gap and said stationary annular core, and means rotating said shaft to produce a rotating magnetic field in said annular gap giving rotational movement to the liquid metal therein.

References Cited in the file of this patent

UNITED STATES PATENTS

| | | |
|---|---|---|
| 2,730,951 | Donelian | Jan. 17, 1956 |
| 2,811,107 | Brill | Oct. 29, 1957 |

FOREIGN PATENTS

| | | |
|---|---|---|
| 661,756 | Great Britain | Nov. 28, 1951 |